United States Patent
Vaage (10) Patent No.: US 6,903,998 B2
(45) Date of Patent: *Jun. 7, 2005

(54) METHOD FOR ACQUIRING AND PROCESSING SEISMIC SURVEY DATA USING OCEAN BOTTOM CABLES AND STREAMERS

(75) Inventor: Svein Torleif Vaage, Weybridge (GB)

(73) Assignee: PGS Americas, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/795,739

(22) Filed: Mar. 8, 2004

(65) Prior Publication Data

US 2004/0218470 A1 Nov. 4, 2004

Related U.S. Application Data

(63) Continuation of application No. 10/266,406, filed on Oct. 8, 2002, now Pat. No. 6,704,244.

(51) Int. Cl.[7] .............................. G01V 1/28; G01V 1/38
(52) U.S. Cl. ........................... 367/24; 367/13; 181/110; 702/17
(58) Field of Search .............................. 367/13, 15, 21, 367/24; 181/110; 702/17

(56) References Cited

U.S. PATENT DOCUMENTS

| | | |
|---|---|---|
| 2,757,356 A | 7/1956 | Haggerty |
| 3,689,874 A | 9/1972 | Foster et al. |
| 3,715,715 A | 2/1973 | Ruehle |
| 4,486,865 A * | 12/1984 | Ruehle .......................... 367/24 |
| 4,706,225 A | 11/1987 | Raoult |
| 4,794,573 A | 12/1988 | Bell et al. |
| 4,953,657 A | 9/1990 | Edington |
| 5,588,032 A | 12/1996 | Johnson et al. |
| 5,621,700 A | 4/1997 | Moldoveanu |
| 5,696,734 A | 12/1997 | Corrigan |
| 5,724,306 A | 3/1998 | Barr |
| 5,774,417 A | 6/1998 | Corrigan et al. |
| 5,781,503 A | 7/1998 | Kim |
| 5,793,702 A | 8/1998 | Paffenholz |
| 5,924,049 A | 7/1999 | Beasley et al. |
| 5,940,788 A | 8/1999 | Morman et al. |
| 5,963,507 A | 10/1999 | Barr et al. |
| 5,991,238 A * | 11/1999 | Barr ............................. 367/24 |
| 6,021,379 A | 2/2000 | Duren et al. |
| 6,151,556 A | 11/2000 | Allen |
| 6,178,381 B1 | 1/2001 | Padhi et al. |
| 6,208,587 B1 | 3/2001 | Martin |
| 6,314,371 B1 | 11/2001 | Monk |
| 6,317,384 B1 | 11/2001 | Luo et al. |
| 6,317,695 B1 | 11/2001 | Zhou et al. |
| 6,381,544 B1 | 4/2002 | Sallas et al. |
| 6,704,244 B1 * | 3/2004 | Vaage .......................... 367/24 |

FOREIGN PATENT DOCUMENTS

WO   WO 02/10798   2/2002

* cited by examiner

*Primary Examiner*—Ian J. Lobo
(74) *Attorney, Agent, or Firm*—E. Eugene Thigpen; Richard A. Fagin (57) ABSTRACT

A method is disclosed for marine seismic surveying in which a seismic signal is detected in a body of water with a motion sensor and a pressure sensor positioned at a location proximate the bottom of the body of water. Seismic signals are detected with pressure sensors positioned in one or more streamer cables being towed in the body of water near the location proximate the bottom of the water at which a motion sensor and a pressure sensor are positioned. The signals detected by the motion sensor and pressure sensor positioned proximate the bottom of the body of water are used for calibrating the seismic signals detected with the pressure sensors positioned in the streamer cables.

17 Claims, 5 Drawing Sheets

METHOD FOR ACQUIRING AND PROCESSING SEISMIC SURVEY DATA USING OCEAN BOTTOM CABLES AND STREAMERS

CROSS-REFERENCE TO RELATED APPLICATION

This application is a continuation of U.S. patent application Ser. No. 10/266,406 filed on Oct. 8, 2002 now U.S. Pat. No. 6,704,244.

STATEMENT REGARDING FEDERALLY SPONSORED RESEARCH OR DEVELOPMENT

Not applicable.

BACKGROUND OF INVENTION

1. Field of the Invention

The invention relates generally to the field of seismic surveying. More particularly, the invention relates to methods for acquiring and processing marine seismic data to determine geologic structures below the surface of the earth.

2. Background Art

Seismic surveying is known in the art for determining structures of rock formations below the earth's surface. Seismic surveying generally includes deploying an array of seismic sensors at the surface of the earth in a selected pattern, and selectively actuating a seismic energy source positioned near the seismic sensors. The energy source may be an explosive, a vibrator, or in the case of seismic surveying performed in the ocean ("marine seismic surveying"), one or more air guns or water guns.

Seismic energy which emanates from the source travels through the earth formations until it reaches an acoustic impedance boundary in the formations. Acoustic impedance boundaries typically occur where the composition and/or mechanical properties of the earth formation change. Such boundaries are referred to as "bed boundaries". At a bed boundary some of the seismic energy is reflected back toward the earth's surface, where it may be detected by one or more of the seismic sensors deployed on the surface. Seismic signal processing known in the art has as one of a number of objectives the determination of the depths and geographic locations of bed boundaries below the earth's surface. The depth and location of the bed boundaries is inferred from the travel time of the seismic energy to the bed boundaries and back to the sensors at the surface.

Marine seismic surveying known in the art includes having a vessel tow one or more seismic energy sources, and the same or a different vessel tow one or more "streamers." Streamers are cables having arrays of seismic sensors. Typically, a seismic vessel will tow a plurality of such streamers arranged to be separated by a selected lateral distance from each other in a pattern selected to enable relatively complete determination of the geologic structures below the sea floor in three dimensions.

The sensors used in streamers are typically hydrophones. Hydrophones are a type of sensor which generates an electrical signal or optical signal corresponding to a change in pressure. Hydrophones known in the art include a transducer, such as a piezoelectric crystal, which generates an electrical voltage when compressed. Recording equipment located on the seismic vessel is operatively connected to the hydrophones on the streamers, and makes a record with respect to time since actuation of the one or more air guns of the signal generated by each of the hydrophones.

Another type of marine seismic surveying known in the art includes positioning cables on the sea floor which include therein a plurality of seismic sensors. These cables are known in the art as ocean bottom cables ("OBC"). In seismic surveying using OBCs, a vessel on the water surface tows one or more seismic energy sources, and signals generated by the seismic sensors in the OBCs are recorded.

OBCs known in the art typically include hydrophones as seismic sensors, as do streamers towed in the water. Generally speaking, marine seismic surveys are susceptible to "ghosting" in the detected seismic signals. As is known in the art, the water surface forms an acoustic impedance boundary with the air above, and generally reflects a substantial amount of seismic energy from "upgoing" seismic waves (waves traveling upwardly toward the water surface). Ghosting is a particular problem in OBC surveys because the depth of the water is typically such that surface reflected waves are difficult to discriminate from seismic energy reflected from bed boundaries on the basis of time of arrival of the energy at the seismic sensors.

It is known in the art to include geophones or other type of sensor which is responsive to particle motion (either displacement, velocity or acceleration) in OBCs. The reason for including velocity or motion-sensitive sensors in OBCs is that these sensors are responsive not only to the magnitude of the particle motion, but also to its direction. Geophones, for example, include a wire coil suspended proximate a magnet. The coil is suspended such that it will move when the geophone is moved in response to seismic energy arriving at the geophone. A voltage is generated by the coil which is related to the velocity at which the geophone moves near the magnet. The polarity of the voltage is related to the direction that the geophone moves. It is therefore possible to determine the direction from which seismic energy arrives at the geophones. By combining geophone signals with hydrophone signals, it is thus possible to determine which parts of the detected seismic signals result from upgoing energy and which parts result from "downgoing" energy. Downgoing energy results from seismic energy reflecting off the water surface.

It is, however, relatively difficult and expensive to deploy OBCs. OBCs must be removed from the ocean floor and redeployed at new selected positions along the ocean floor in order to seismically survey a different part of the subsurface. Each time the OBCs are redeployed, the geographic positions of the seismic sensors must be accurately established in order that subsurface structures inferred from the seismic survey can be properly referenced geographically. Geographic coverage using towed streamers is much more efficient because of the relative ease with which streamers can be moved through the water, and because the streamers are positioned near the water surface their instantaneous geographic position can be determined using satellite-based systems such as global positioning system ("GPS") receivers. It is desirable, therefore, to have a method for acquiring seismic survey data which takes advantage of the geographic coverage ability of towed streamers, with the more ghost-free images that can be obtained using OBCs.

SUMMARY OF INVENTION

In one embodiment the invention comprises a method for marine seismic surveying in which a seismic signal is detected in a body of water with a motion sensor and a pressure sensor positioned at a location proximate the bottom of the body of water, and seismic signals are detected in the body of water by pressure sensors positioned in at least one streamer cable being towed in the body of water near the location at which a motion sensor and a pressure sensor are positioned. The signals detected by the sensors at the location proximate the bottom of the body of water are used for calibrating the seismic signals detected with the sensors positioned in the streamer cable.

In another embodiment the invention comprises a method for marine seismic surveying in which an upgoing component and a downgoing component of a seismic wavefield are determined at a first location on a seafloor and a separation operator is determined from the determined upgoing component and downgoing component of the seismic wavefield. A seismic wavefield is determined for a first seismic streamer location substantially above the first seafloor location, and the separation operator is applied to the determined seismic wavefield for the first streamer location to provide an estimate of at least one of an upgoing wavefield component and a downgoing wavefield component of the determined seismic wavefield for the first streamer location.

Other aspects and advantages of the invention will be apparent from the following description and the appended claims.

DETAILED DESCRIPTION

Figure 1:
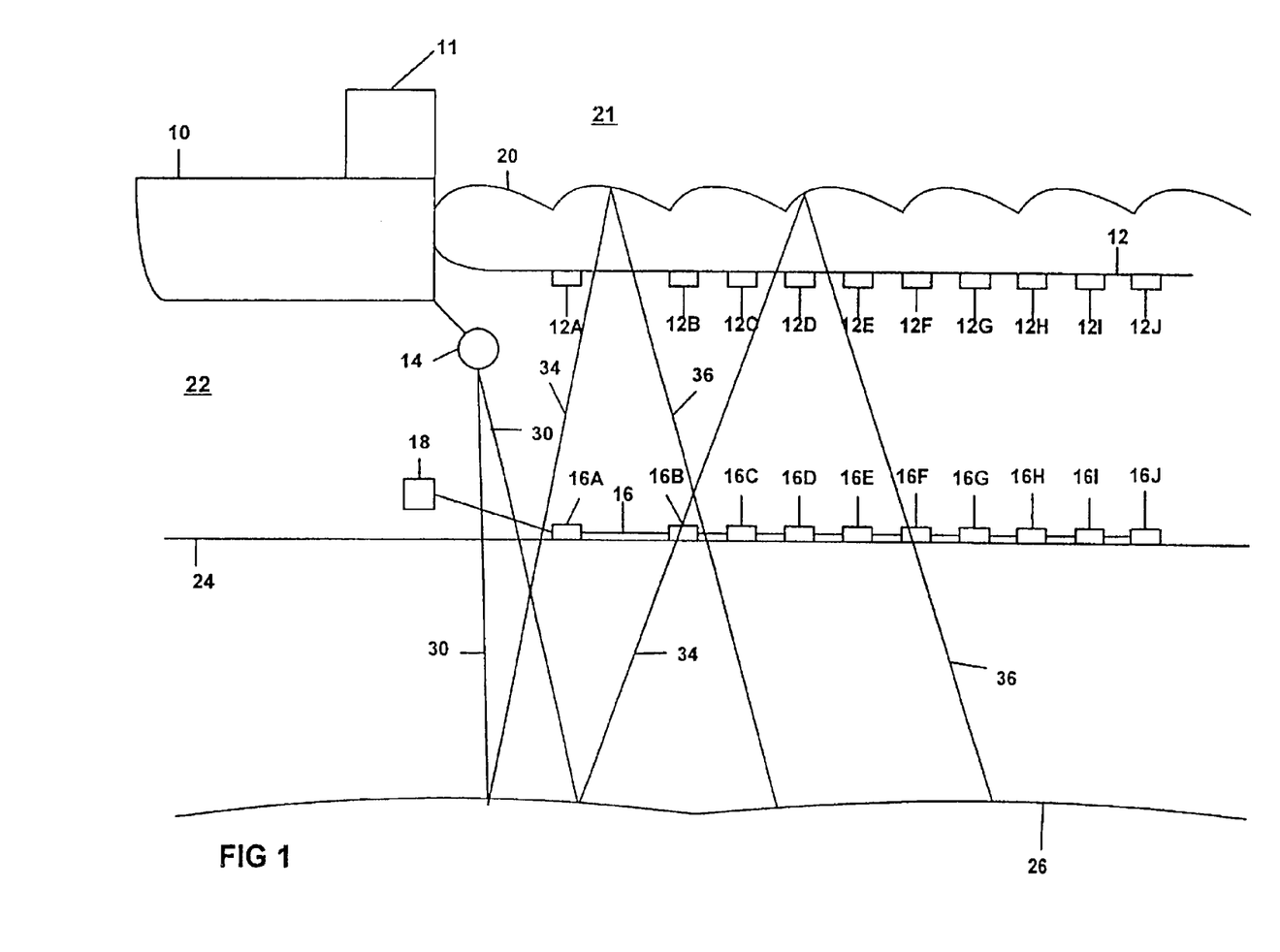
FIG. 1 shows an example of marine seismic signal acquisition in accordance with an embodiment of the invention.

An example of a marine seismic data acquisition system and method that can be used with embodiments of the invention is shown generally in FIG. 1. A seismic vessel 10 is shown towing a streamer 12 having sensors, typically hydrophones, 12A–12J disposed at known spaced apart positions along the steamer 12 The vessel 10 in FIG. 1 also tows a seismic energy source 14. In some embodiments the seismic energy source 14 is an air gun array. An ocean bottom cable ("OBC") 16 is shown disposed on the sea bottom 24 at a position substantially directly below the position of the streamer 12. When the OBC 16 is positioned directly below the streamer 12, the OBC 16 will detect seismic signals related to substantially the same subsurface structures as the signals detected by the hydrophones 12A–12J on the streamer 12.

The OBC 16 includes seismic sensors 16A–16J thereon at known spaced apart positions. As is known in the art, the sensors 16A–16J on the OBC 16 typically include both hydrophones and geophones. Signals detected by each of the sensors 16A–16J may be sent to a recording device 18 for later processing which will be further explained. Typically, signals detected by the streamer hydrophones 12A–12J will be transmitted to and recorded by recording equipment 11 on the seismic vessel 10. The manner of recording and/or transmitting signals from the various sensors, including streamer hydrophones 12A–12J and OBC sensors 16A–16J shown in FIG. 1, is only meant to serve as an example of how seismic signals may be acquired for purposes of the invention and is not intended to limit the scope of the invention.

The recording equipment 11 includes a system (not shown separately in FIG. 1) for selectively actuating the seismic energy source 14, and for recording detected signals time indexed with respect to initiation of the source 14. This time record is the reference by which signals detected by the OBC sensors 16A–16H and streamer hydrophones 12A–12J are indexed, as is well known in the art. The recording equipment 11 may also include means for receiving data (not shown) from the recording device 18.

When the seismic energy source 14 is actuated, seismic energy travels generally downwardly through the water 22, as shown at 30. The downgoing seismic energy 30 is partially reflected by acoustic impedance boundaries below the sea floor 24, such as the one shown at 26 in FIG. 1. Reflected energy, shown at 34, travels upwardly ("upgoing seismic energy") and is detected by one or more of the OBC sensors 16A–16J. As shown at 34, the energy continues to travel upwardly through the water 22 and is detected by one or more of the streamer hydrophones 12A–12J.

Some of the upgoing seismic energy 34 is reflected from water surface 20, as explained in the Background section herein, because the water surface 20 forms an acoustic impedance boundary with the air 21 above. Energy reflected from the water surface 20 is shown at 36 in FIG. 1 and is detected by the OBC sensors 16A–16J and by the hydrophones 12A–12J.

It will be understood that seismic energy propagates substantially spherically from a source point and from a reflection point, and that the seismic energy travel paths shown in FIG. 1 are for illustration purposes only. As is known in the art, signals from a plurality of the sensors 16A–16J and hydrophones 12A–12J may be summed or "stacked" after appropriate correction for total travel path length in order to increase the useful signal amplitude corresponding to selected positions along the impedance boundary 26. Stacking methods known in the art include, for example, common depth point (CDP) and common mid point (CMP).

The arrangement of seismic source 14, streamer 12 and OBC 16 shown in FIG. 1 is only meant to illustrate the principle of the invention. As is well known in the art, typical arrangements for marine data acquisition may include additional vessels (not shown) which tow seismic sources in addition to the source shown as 14. The seismic source or sources may also be towed by a vessel other than the vessel that tows the streamers. As is also known in the art, typical seismic vessels will tow a plurality of streamers arranged in a laterally spaced apart array so that seismic signals may be rapidly and efficiently acquired corresponding to a relatively large area of the subsurface.

Having shown in general terms marine seismic acquisition, a method for processing seismic data according to the invention will now be explained. The signals detected by the OBC sensors 16A–16J may first be processed, after retrieving the data stored in the recording device 18, to substantially reduce the effects of water surface reflected energy (referred to as water surface multiples). Including geophones in the OBC sensors 16A–16H, as previously explained, enables the effect of water surface multiples to be reduced because the downgoing reflected energy, such as shown at 36, will cause a response in the hydrophones (not shown separately) having the inverse polarity to the hydrophone response to the upgoing energy 34.

Expressed mathematically, a total signal including both directly arriving and reflected energy, the total signal called a "wavefield", detected by the hydrophones in the OBC sensors 16A–16J may be represented by the functional notation H(x, y, zf, t), where x and y represent coordinates related to the geographic position of each individual hydrophone, zf represents the depth in the water of each hydrophone, and t represents time, typically indexed with respect to actuation time of the seismic energy source 14. Similarly, G(x, y, zf, t) may be used to represent the detected wavefield for each geophone in the sensors OBC 16A–16J. It is known in the art that the wavefields at each of the hydrophones and geophones are related to each other, or expressed mathematically:

$$H(x,y,zf,t)=kG(x,y,zf,t) \quad (1)$$

Methods for determining the relational factor k are known in the art. For simplicity of the explanation that follows, it will be assumed that the relational factor has already been taken into account and that the hydrophone wavefield, H(x, y, zf, t), is equal to the geophone wavefield, G(x, y, zf, t). By convention, the sign of a compressional energy signal is considered to be negative if it is in a downgoing portion of the total wavefield, and is considered to be positive if it is in an upgoing portion of the total wavefield. In this case, the sum of the hydrophone signal and the geophone signal is zero for the downgoing signal components, and is equal to twice the actual signal amplitude for the upgoing signal components. Therefore, a total wavefield detected at the sea floor 24, represented by F, has an upgoing component, $F_u$, that can be represented by the expression:

$$F_u=(H+G)/2 \quad (2)$$

The total wavefield also has a corresponding downgoing component, $F_d$, that can be represented by the expression:

$$F_d=(H-G)/2=(G-H)/2 \quad (3)$$

The total wavefield F is the sum of the upgoing $F_u$ and downgoing $F_d$ wavefield components, as shown in the following expression:

$$F=F_u+F_d \quad (4)$$

In the example acquisition system shown in FIG. 1, the total wavefield detected by the streamer hydrophones 12A, represented by S, is similar to the total wavefield F detected by the OBC sensors 16A–16J, in that the total streamer wavefield S includes both upgoing and downgoing components, as shown in the following expression:

$$S=S_u+S_d \quad (5)$$

Differences between the wavefields detected by the OBC sensors and by the streamer hydrophones, F and S, respectively, arise from the fact that the signals detected by the OBC sensors and by the streamer hydrophones are recorded at different water depths, and as a result are recorded in different surrounding environmental factors. Such factors include, for example, the distance through the water between seismic energy source 14 and the individual sensors, the water temperature and hydrostatic pressure, and the distance between each sensor and the particular impedance boundary, such as the water surface 20, and the subsurface boundary 26.

In embodiments of a method according to the invention, a propagation operator, O, is determined, in a general sense, by comparing the streamer detected wavefield S to the OBC-detected wavefield F. The propagation operator is a mathematical expression which when applied to the OBC-detected signals produces a signal that is substantially the same as the streamer-detected signals. Determining the propagation operator can be explained as follows. A propagation operator for upgoing components, $O_u$, can be determined, which when applied to the upgoing component of the sea floor wavefield, $F_u$, will produce a signal equivalent to the upgoing component of the streamer wavefield, $S_u$. A similar propagation operator may be determined for the downgoing components of both the sea floor and streamer wavefields. The relationship between the sea floor and streamer wavefield components can be expressed mathematically by the following expressions.

$$O_u \times F_u = S_u$$
$$O_d \times F_d = S_d \quad (6)$$

The upgoing component operator, $O_u$, may be assumed to be substantially the inverse of the downgoing component operator, expressed as:

$$O_d = O_u^{inv} \quad (7)$$

The upgoing and downgoing components of the streamer wavefield can then be expressed as:

$$O_u \times F_u = S_u$$
$$O_u^{inv} \times F_d = S_d \quad (8)$$

The propagation operator, O, (in the form of the upgoing component operator $O_u$ and its downgoing components inverse $O_u^{inv}$) is determined when a difference between the measured streamer wavefield S, and a sum of the upgoing component operator $O_u$ applied to the upgoing component of the sea floor wavefield $F_u$ and the downgoing component operator $O_u^{inv}$ applied to the downgoing component of the sea floor wavefield $F_d$ is a minimum. Expressed mathematically:

$$(O_u \times F_u + O_u^{inv} \times F_d) - S \rightarrow \min \quad (9)$$

When the propagation operator, O, is determined, it then is possible to estimate the individual upgoing wavefield, $S_u$, and downgoing wavefield, $S_d$, components of the total streamer wavefield, S, by applying the appropriate components of the propagation operator, $O_u$ and $O_d$, respectively, to the upgoing $F_u$ and downgoing $F_d$ wavefield components of the total OBC wavefield F.

The upgoing and downgoing components of the streamer wavefield thus determined may then be used to determine a streamer wavefield separation operator, P, ("separation operator") which separates upgoing and downgoing components of the total streamer wavefield, S, without further reference to the OBC-detected wavefield, F. For data acquired as shown in FIG. 1, the separation operator P can be determined as upgoing and downgoing component operators according to the following expression such that upgoing and downgoing components of the streamer wavefield are substantially equal to those calculated using the components of the propagation operator:

$$S_u = S \times P_u = F_u \times O_u;$$
$$S_d = S \times P_d = F_d \times O_u^{inv} \quad (10)$$

or expressed alternatively, the separation operator is determined when a difference between the upgoing and downgoing streamer components calculated using the separation operator and respectively calculated using the propagation operator reaches a minimum:

$$(S \times P_u) - (F_u \times O_u) \rightarrow \min$$

$$(S \times P_d) - (F_d \times O_u^{inv}) \rightarrow \min$$

Figure 2:
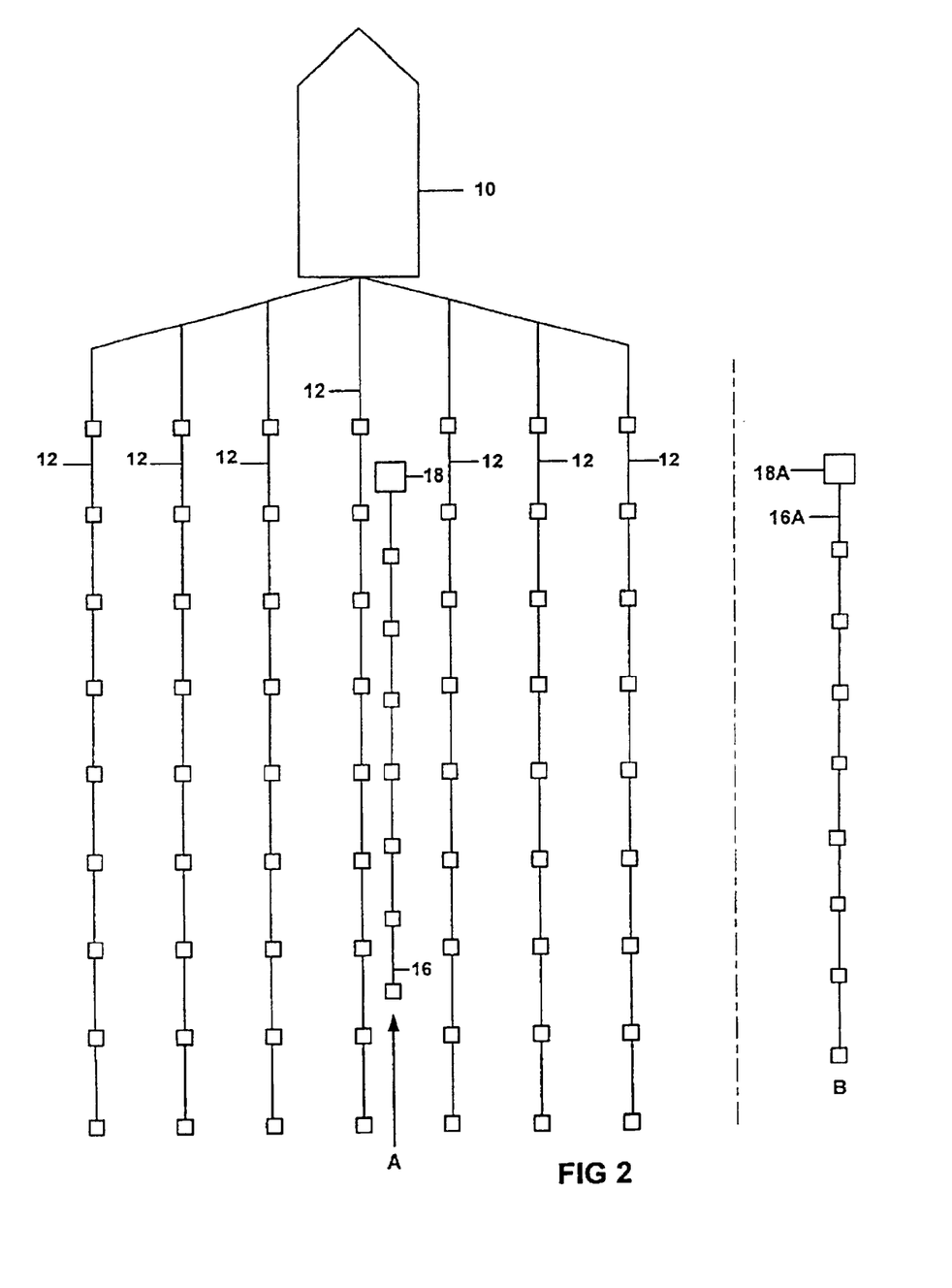
FIG. 2 shows an example of marine seismic signal acquisition in accordance with an embodiment of the invention.

The same upgoing and downgoing separation operator components, $P_u$ and $P_d$, determined from the data acquired when the streamer is substantially directly above the OBC and shown above in equation (10) may be used, in some embodiments, to determine upgoing, $S_u$, and downgoing $S_d$, wavefield components of the total streamer wavefield, S, acquired when the streamer 12 is located other than directly above the OBC 16. In such embodiments, the operator components $P_u$ and $P_d$ determined as explained above are applied to the total streamer wavefield measured when the streamer 12 is positioned other than directly above the OBC 16. Streamer wavefields may be acquired other than directly above the OBC using a single streamer positioned at such locations, or may be acquired using a plurality of streamers laterally spaced apart from each other, as will be explained below with reference to FIGS. 2, 3, 4 and 5. By using separation operators calculated as explained above, upgoing and downgoing wavefields may be determined for a seismic survey using streamers and a limited number of OBCs. The number of OBCs for a particular survey area can be substantially reduced from the number that would be required for a survey using only OBCs. An exemplary embodiment of the invention can be explained with reference to the illustration of FIG. 2 and the flow charts of FIGS. 3, 4 and 5. Referring first to FIG. 2, an OBC 16 may be positioned on the ocean floor at first location, indicated by A. A vessel 10 towing a plurality of streamers 12, for example, eight streamers, traverses a path parallel to the lie of, and substantially directly above the position of, the OBC 16. The vessel 10 may then traverse additional paths (not shown) in a direction parallel to the lie of the OBC 16, but laterally offset from the OBC 16 location. An amount of lateral offset of such streamer paths with respect to the first OBC location A that will be yield acceptable data may need to be determined for each survey, and will depend on variations in the acoustic impedance of the subsurface.

A second location for the OBC 16 is shown in FIG. 2 at B. The second location B of the OBC may use the same or a different OBC as used to survey the first location A. The embodiment shown in FIG. 2 contemplates using a second OBC 16A coupled to a second recording device 18A, but using more than one OBC is not intended to limit the scope of the invention. In other embodiments, a single OBC may be moved to different locations along the sea floor. Those skilled in the art will appreciate that the vessel 10 may also traverse paths perpendicular to or having other relationships with respect to the direction along which the OBC 16 lies.

In some embodiments, data from the OBC 16 recorded at the first location A may be used to determine a first propagation operator O and an associated separation operator P. Data from the OBC 16A recorded at the second location B may be used to determine a second propagation operator O and associated separation operator P.

Figure 3:
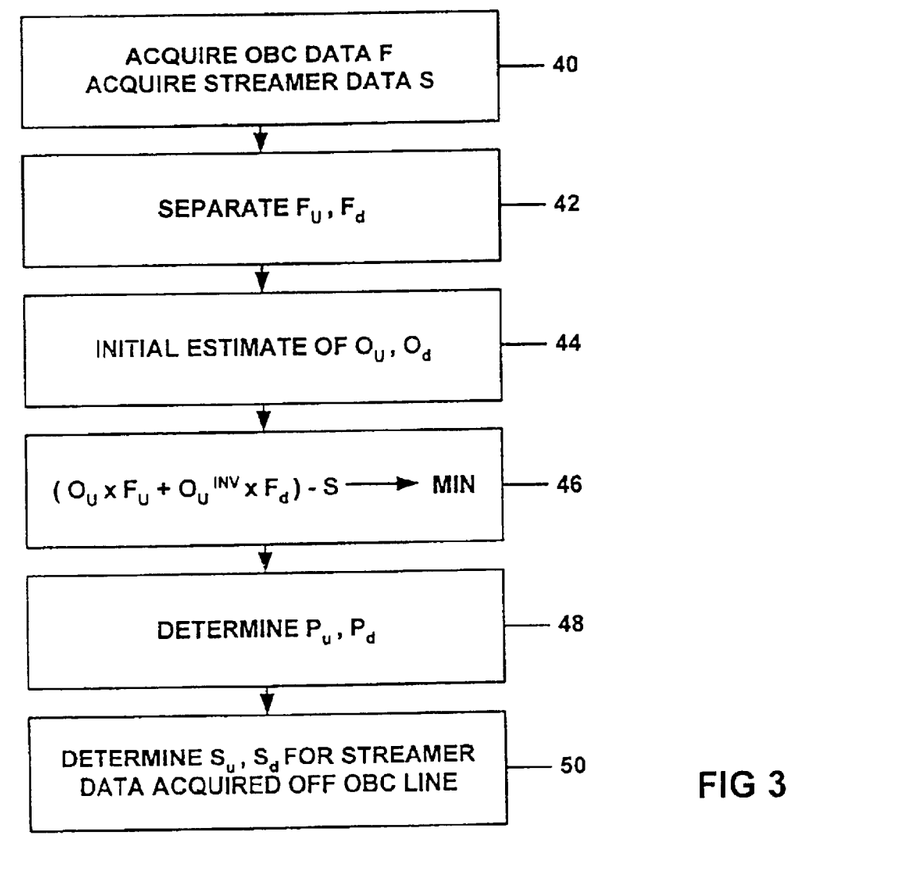
FIG. 3 shows a flow chart of one embodiment of a method according to the invention.

Referring to FIG. 3, data are acquired, at 40, by both the OBC and by the streamers as explained above with reference to FIG. 2. At 42, upgoing and downgoing components of the OBC data are separated using techniques known in the art. At 44, an initial estimate of upgoing and downgoing first propagation operator components is made, which may be based on data acquired by one of the streamers positioned substantially directly above the OBC at the first location (A in FIG. 2). At 46, an improved first propagation operator is determined when the sum of the propagated upgoing and downgoing OBC signal components most closely matches the total steamer wavefield, as explained above with reference to equation (9).

At 48, first separation operator components are determined, such that the upgoing streamer wavefield component calculated by applying the upgoing separation operator to the streamer wavefield substantially matches the upgoing streamer wavefield component calculated by applying the upgoing propagation operator component to the upgoing OBC wavefield component. Similarly, the downgoing separation operator component is calculated such that the downgoing streamer wavefield component calculated by applying the downgoing separation operator to the streamer wavefield substantially matches the downgoing streamer wavefield component calculated by applying the downgoing propagation operator component to the downgoing OBC wavefield component. At 50, the first separation operator components are used to determine upgoing and downgoing components of streamer data acquired at locations other than directly above the first location of the OBC (A in FIG. 2).

Figure 4:
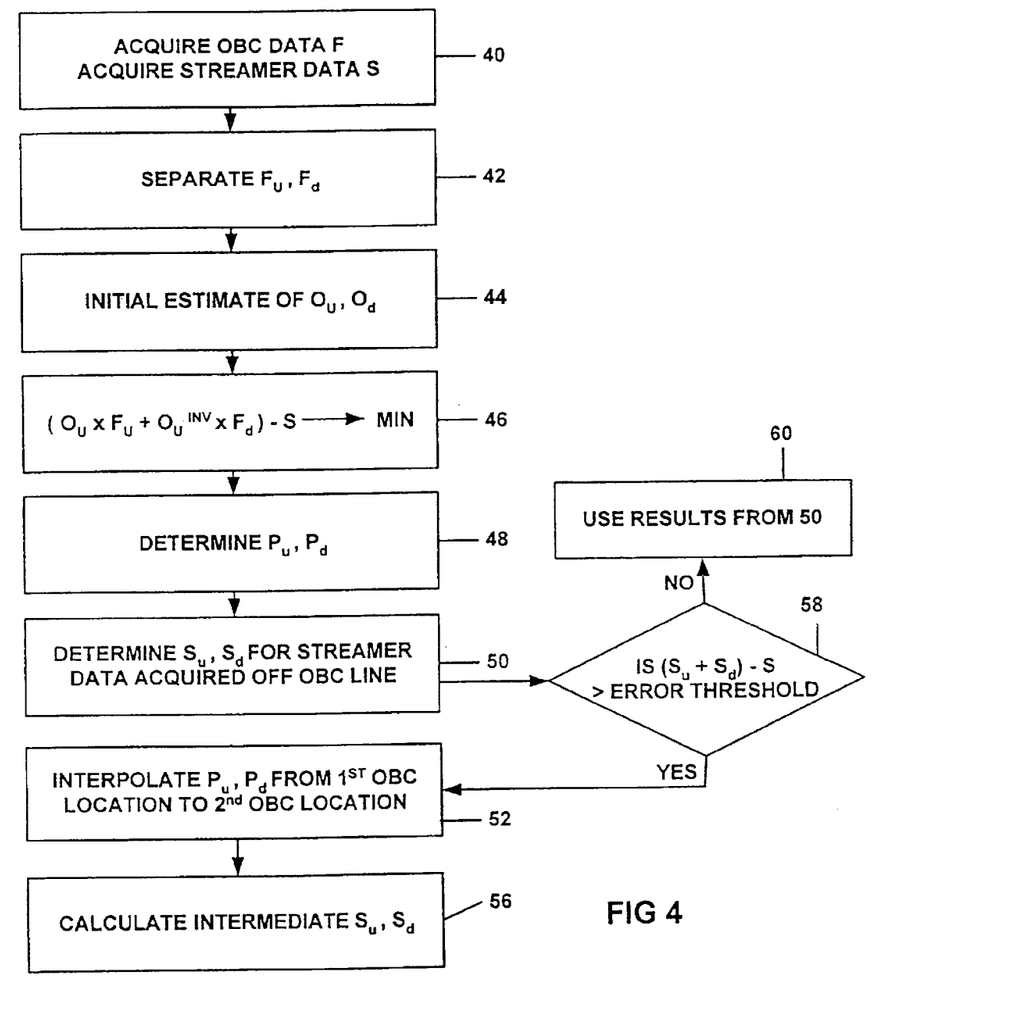
FIG. 4 shows a flow chart of another embodiment of a method according to the invention.

With reference to FIG. 4, in some embodiments, as shown at 58, a sum of the calculated upgoing and downgoing streamer components, calculated using the component separation operators, is checked with respect to the measured total streamer wavefield acquired at the particular streamer location being evaluated. If a difference between the summed upgoing and downgoing streamer signal components and the measured streamer signal is below a selected error threshold, the upgoing and downgoing components of streamer wavefields calculated for that location may be used, as indicated at 60.

If the error threshold is exceeded, the separation operator may be interpolated based on the intermediate position of the streamer with respect to the first location (A in FIG. 2) and a second OBC location (e.g., B in FIG. 2) as shown at 52. Interpolation may be performed by interpolating between the separation operator determined for the first location (A in FIG. 2) and the separation operator determined for the second location (B in FIG. 2). Upgoing and downgoing components of the interpolated separation operator can be used to determine upgoing and downgoing components of the streamer wavefields measured at the intermediate position, as shown at 56. In some embodiments, the interpolation can be linear and related to the streamer position with respect to both the first (A in FIG. 2) and second (B in FIG. 2) OBC locations. Interpolation procedures which may be used in such embodiments of the invention as known in the art.

Figure 5:
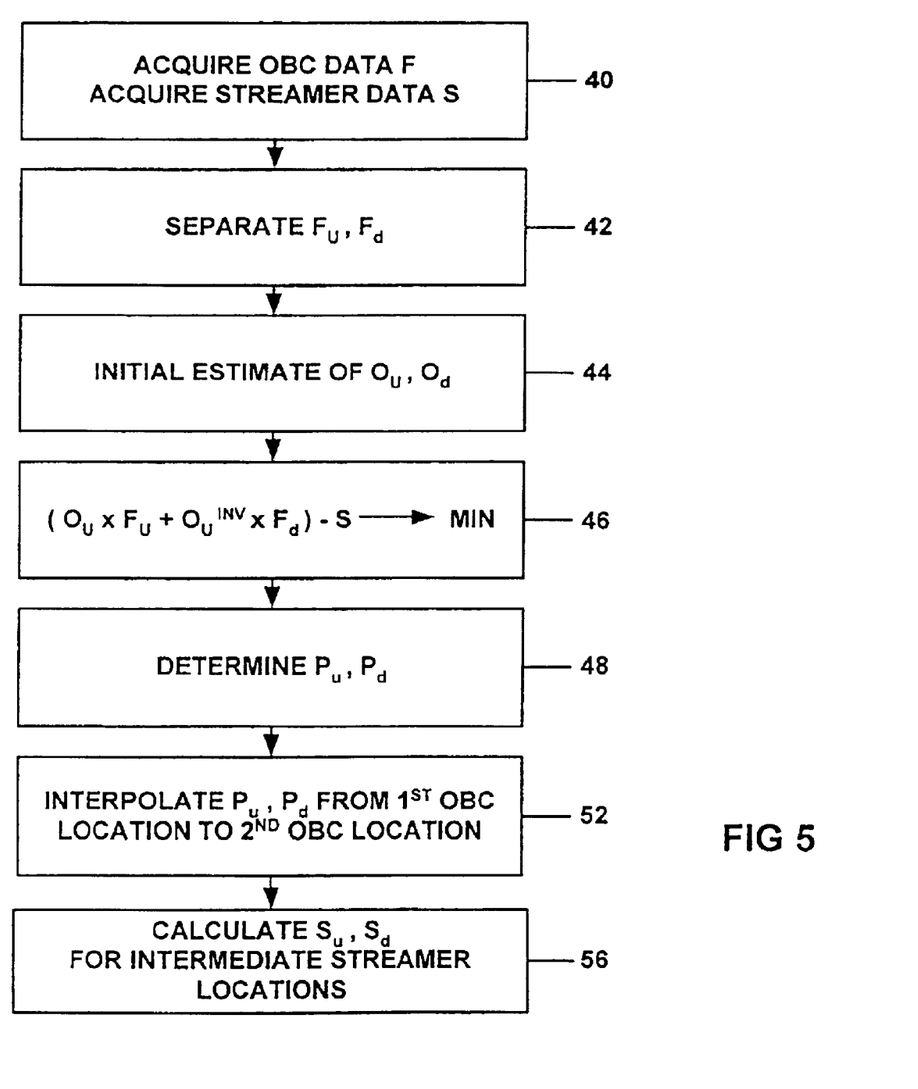
FIG. 5 shows a flow chart of yet another embodiment of a method according to the invention.

With reference to FIG. 5, alternatively, at 52, the separation operator for any selected streamer position, located at an intermediate location with respect to the first OBC location and second OBC location, may be interpolated between two OBC positions without determining an error between the measured streamer wavefield and the sum of the calculated upgoing and downgoing streamer wavefield components. Upgoing and downgoing components of the interpolated separation operator are then used to determine upgoing and downgoing components of the streamer wavefields measured at the intermediate position, as shown at 56.

Interpolation as explained above may be used between any two additional OBC locations within a particular survey area. As explained above, the number of OBC locations needed for a particular survey area may have to be evaluated for each survey and will depend on such factors as the acoustic impedance of the subsurface.

Embodiments of a method according to the invention may improve efficiency of acquisition using ocean bottom cables by reducing the required survey density of the OBC data for a particular survey area. Reducing OBC survey density may reduce the time and effort required to place and precisely locate the sensors on the OBC.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic surveying in a body of water, comprising:
   detecting a seismic signal in the body of water with a motion sensor and a pressure sensor positioned at a location proximate the bottom of said body of water;
   detecting seismic signals in the body of water with pressure sensors positioned in at least one streamer cable being towed in said body of water near said location proximate the bottom of said body of water; and
   using said signals detected by said sensors positioned at a location proximate the bottom of said body of water for calibrating said seismic signals detected with said pressure sensors positioned in said at least one streamer cable.

2. The method of claim 1 wherein using said signals detected by said sensors positioned at a location proximate the bottom of said body of water comprises determining a separation operator, said separation operator determined such that when applied to the seismic signals detected with said sensors positioned in said at least one streamer cable provides an estimate of at least one of an upgoing component and a downgoing component of a seismic wavefield.

3. The method of claim 2 wherein calibrating said seismic signals detected with said sensors positioned in said at least one streamer cable comprises applying said separation operator to the seismic signals detected with sensors positioned in said at least one steamer cable to estimate at least one of an upgoing and a downgoing wavefield component of a seismic wavefield.

4. The method of claim 2 wherein determining said separation operator comprises:
   determining an upgoing wavefield component and a downgoing wavefield component of said seismic signals detected at said location proximate the bottom of said body of water; and
   utilizing said determined upgoing component and downgoing component of the seismic wavefield of said seismic signals detected at said location proximate the bottom of said body of water and signals detected with sensors positioned in a streamer cable at the location substantially above said location proximate the bottom of said body of water to determine said separation operator.

5. The method of claim 1 wherein seismic signals resulting from an actuation of a seismic energy source are detected by the sensors positioned at a location proximate the bottom of said body of water and by the sensors positioned in at least one streamer cable.

6. A method for seismic surveying, comprising:
   deploying an ocean bottom cable at a first seafloor location, the cable comprising at least one pressure sensor and at least one motion sensor;
   recording signals detected by the at least one pressure sensor and at least one motion sensor in said ocean bottom cable at said first seafloor location;
   utilizing the recorded signals detected by said seismic sensors on said first seafloor location to calculate an upgoing component and a downgoing component of a seismic wavefield at said first seafloor location;
   deploying at least one seismic streamer at a first streamer location substantially above the first seafloor location, said seismic streamer having at least one pressure sensor positioned therein;
   recording signals detected by said pressure sensor in the streamer at said first streamer location;
   applying an upgoing propagation operator to said upgoing component at said first seafloor location to generate an estimate of an upgoing component of said wavefield at said first streamer location;
   applying a downgoing propagation operator to said downgoing component at said first seafloor location to generate an estimate of a downgoing component of said wavefield at said first streamer location;
   determining the difference between said recorded seismic wavefield detected at said first streamer location and a summation of said estimated upgoing component and estimated downgoing component of said wavefield at said first streamer location; and
   modifying said upgoing propagation operator and downgoing propagation operator so as to reduce said difference, thereby generating improved upgoing and downgoing propagation operators.

7. The method of claim 6 further comprising determining a separation operator comprising an upgoing separation operator and a downgoing separation operator, such that the application of said upgoing separation operator to said recorded streamer signal detected at said first streamer location results in a signal substantially equivalent to the result of applying said improved upgoing propagation operator to the upgoing component of the wavefield detected at the first seafloor location and the application of said downgoing separation operator to said recorded streamer signal detected at said first streamer location results in a signal substantially equivalent to the results of applying said improved downgoing propagation operator to the downgoing component of said wavefield detected at the first seafloor location.

8. The method of claim 7 further comprising applying at least one of said upgoing separation operator and downgoing separation operator to seismic wavefields detected at locations other than substantially above said first location to estimate at least one of an upgoing wavefield component and downgoing wavefield component at said other locations.

9. The method of claim 7 further comprising:
   determining an upgoing component and a downgoing component of a seismic wavefield at a second location on said seafloor;
   determining for a second seismic streamer location substantially above said second seafloor location the seismic wavefield of which an upgoing component and a downgoing component is determined at said second location on said seafloor;
   utilizing the determined upgoing component and downgoing component of a seismic wavefield at said second location on the seafloor and the determined seismic wavefield for said second streamer location to determine a second separation operator, which second separation operator when applied to the determined seismic wavefield for said second streamer location provides an estimate of at least one of an upgoing component and a downgoing component of said determined seismic wavefield for said second streamer location; and interpolating between the first said determined separation operator and said second determined separation operator to estimate a separation operator for a location intermediate said first streamer location and said second streamer location.

10. The method of claim 9 further comprising applying said interpolated separation operator to a determined seismic wavefield at said intermediate location to estimate at least one of an upgoing wavefield component and a downgoing wavefield component at said intermediate location.

11. The method of claim 9 further comprising:

for said location intermediate said first streamer location and said second streamer location, determining the difference between a determined seismic wavefield at said intermediate location and the sum of an upgoing component and a downgoing component of a wavefield estimated by applying the first said separation operator to said determined seismic wavefield at said intermediate location;

determining whether said difference is greater than a predetermined difference; and applying said interpolated separation operator to a seismic wavefield determined for said intermediate location if said difference is greater than a selected difference to estimate at least one of an upgoing wavefield component and a downgoing wavefield component at said intermediate location.

12. The method of claim 6 wherein recording signals resulting from an actuation of a seismic energy source are detected by said pressure sensor in the streamer and by the at least one pressure sensor and at least one motion sensor in said ocean bottom cable.

13. A method for marine seismic surveying, comprising:

determining an upgoing component and a downgoing component of a seismic wavefield at a first location on a seafloor;

determining a separation operator from the determined upgoing component and downgoing component of the seismic wavefield at said first location on the seafloor;

determining a seismic wavefield for a first seismic streamer location substantially above said first seafloor location;

applying the separation operator to the determined seismic wavefield for the first streamer location to provide an estimate of at least one of an upgoing wavefield component and a downgoing wavefield component of said determined seismic wavefield for said first streamer location.

14. The method of claim 13 further comprising applying said determined separation operator to seismic wavefields detected at streamer locations other than said first streamer location to estimate at least one of an upgoing wavefield component and a downgoing wavefield component at said other streamer locations.

15. The method of claim 13 further comprising:

determining an upgoing component and a downgoing component of a seismic wavefield at a second seafloor location;

determining a second separation operator from the determined upgoing component and downgoing component of the seismic wavefield at said second seafloor location;

determining a seismic wavefield at a second streamer location;

applying the second separation operator to estimate of at least one of an upgoing wavefield component and a downgoing wavefield component of said determined seismic wavefield for said second streamer location; and interpolating between said first determined separation operator and said second determined separation operator to estimate an interpolated separation operator for a location intermediate said first streamer location and said second streamer location.

16. The method of claim 15 further comprising applying said interpolated separation operator to a determined seismic wavefield at said intermediate location to estimate at least one of an upgoing wavefield component and a downgoing wavefield component at said intermediate location.

17. The method of claim 15 further comprising:

for said location intermediate said first streamer location and said second streamer location, determining the difference between a determined seismic wavefield at said intermediate location and the sum of an upgoing component and a downgoing component of a wavefield estimated by applying the first said separation operator to said determined seismic wavefield at said intermediate location;

determining whether said difference is greater than a predetermined difference; and applying said interpolated separation operator to a seismic wavefield determined for said intermediate location if said difference is greater than a selected difference to estimate at least one of an upgoing wavefield component and a downgoing wavefield component at said intermediate location.

* * * * *